Aug. 29, 1939.   E. BORSETTI   2,171,076

MULTIPLE CLAMP

Original Filed Jan. 23, 1937

Inventor,
Ermanno Borsetti,
deceased, by
Ernegia Borsetti, sole
heiress & administratrix
By: Glascock Downing & Seebold
Attys.

Patented Aug. 29, 1939

2,171,076

UNITED STATES PATENT OFFICE

2,171,076

MULTIPLE CLAMP

Ermanno Borsetti, deceased, late of Genova-Sampierdarena, Italy, by Ernegia Borsetti, sole heiress and administratrix, Ferrara, Italy, assignor to Soc. An. Rolla Traverso & Storace, Genova-Sampierdarena, Italy, a corporation of Italy Original application January 23, 1937, Serial No. 121,959½. Divided and this application October 26, 1937, Serial No. 171,168. In Italy January 24, 1936

3 Claims. (Cl. 189—36)

This invention relates to improvements in joints for scaffoldings or framings made out of metallic tubes, as disclosed in my earlier application Serial No. 121,959½ filed Jan. 23, 1937 and of which this is a divisional application.

The main object of the invention is to provide a joint of simple and rugged construction capable of connecting at least three traversing tubes together, thus replacing two of the usual joint for crossing tubes.

The improved joint according to the invention is of the kind comprising a number of relatively fixed sleeve sections or "cradles" and an equal number of co-acting sleeve sections or "covers" hinged to the cradles and adapted to be clamped against their respective cradles and the invention broadly consists in the provision of an improved multiple cradle construction, preferably constituted of a single casting, and in the means for hinging and clamping the covers to said cradle.

Figure 1:
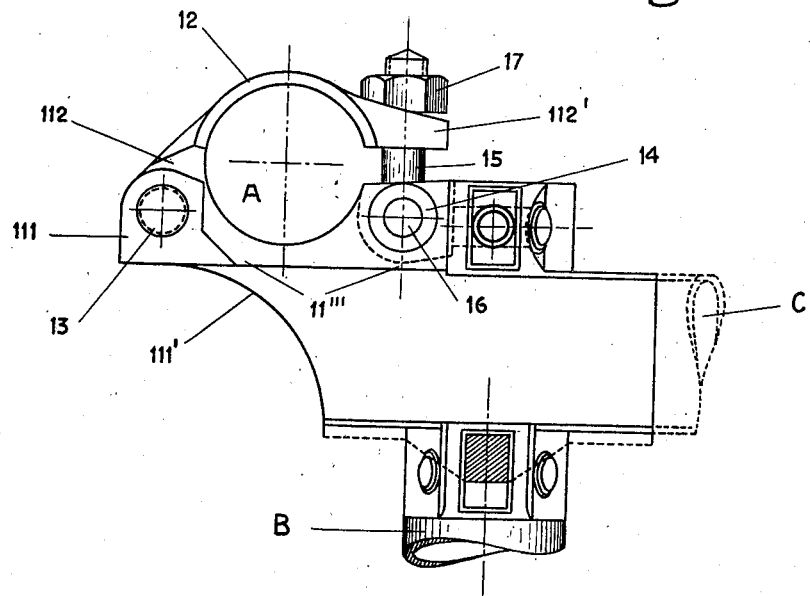
Figure 2:
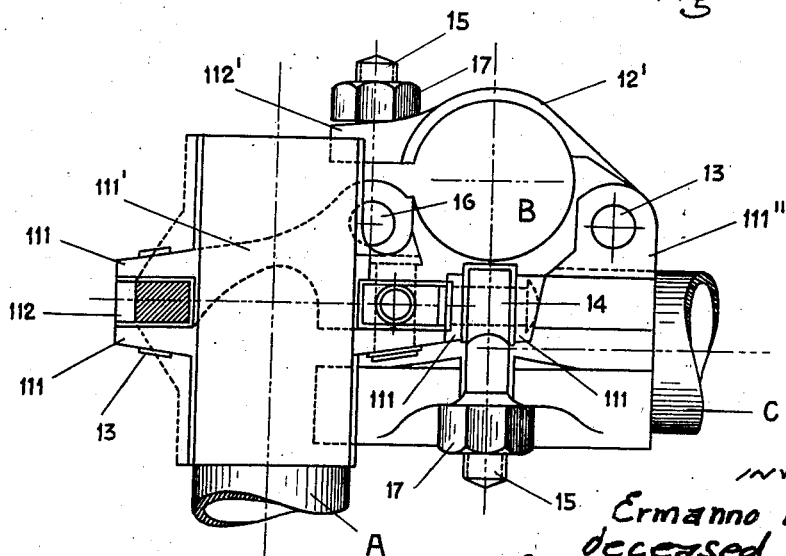

An embodiment of the invention is shown in the annexed drawing, in which Figures 1 and 2 are side views at right angles, with parts in section, of a multiple joint which permits the connection of three traversing tubes at right angles with one another.

In these figures the reference character 11''' indicates a casting comprising three sleeve joint sections or cradles for the three tubes A, B and C to be connected together. The cradles for tubes B and C form a cross joint section, to which the cradle for the tube A is attached preferably with its axis at right angles to the plane of and between the arms of the cross. This cradle section for tube A is thus attached by its rear or convex part both to cradle for tube B and to a bracket-like extension 111' of cradle for tube C. Each of the cradles is provided at both sides with hinge eyes 111 co-acting with hinge eyes 112 formed on one side of the other sleeve sections or covers 12, 12', 12'', the hingle eyes 111 and 112 being connected together by a hinge pivot 13. On the other sides of the cradles, between like hinge eyes 111 the annular head 14 of an eyebolt 15 is fitted and suitably hinged as by means of a rivet 16. The free sides of covers 12, 12', 12'' are provided with slotted ears 112' for permitting of bolt 15 passing therethrough, without completely unscrewing nut 17.

This most simple and useful form of joint presents considerable advantages, as it permits of rigidly clamping three tubes, although these tubes can be mounted and taken off completely independently from each other and thus, although the device is adapted, as stated, to replace two usual cross joints, it may be employed, if the occasion arises, in place of a single cross joint.

Of course the embodiment of joint just described and shown is only one of the possible designs of joints within the scope of the invention. Thus for instance one of the three cradles can be fitted at angles other than right angles with regards to the other two cradles, or also it is possible to arrange between the joints for tubes B and C, at the crossing point thereof, a further fixed or also hinged joint, this latter preferably arranged in one of the ways particularly described and shown in my co-pending application No. 121,959½. Also the eyebolts 15' may be replaced by other known bolts of one of the kinds usually employed in joints for tubular scaffoldings or the like.

What is claimed is:

1. A multiple clamp for frame members comprising, three half sleeve sections each having a convex portion and a concave portion adapted to receive and partly embrace a tubular frame member to provide supporting cradles therefor, the convex portion of one half sleeve section being rigidly connected to the convex portion of the second half sleeve section and the convex portion of the third half sleeve section being rigidly connected to the second half sleeve section with the axes of the cradles extending in three directions, a cover pivoted to each cradle at one side thereof and each cover having outstanding ears at the free side thereof, and a bolt hinged adjacent the other side of each cradle adapted to co-act with the ears for clamping the frame members between the cradles and the covers.

2. A multiple clamp according to claim 1 in which the cradles are integral, two of said cradles being arranged like the arms of a cross and the third cradle being fitted at one of the crossing points of the other cradles so as to be arranged with the axis thereof substantially at right angles to the plane of the cross.

3. A multiple clamp according to claim 1 in which two of the cradles are arranged like the arms of a cross and the third cradle is fitted at one of the crossing points of the other cradles and the third cradle forming an angle with the plane of the cross, and a bracket-like extension projecting from the two cradles rigidly attached to the third cradle.

ERNEGIA BORSETTI,
*Sole Heiress and Administratrix of the Estate of Ermanno Borsetti, Deceased.*